United States Patent [19]
Atwell et al.

[11] Patent Number: 6,042,852
[45] Date of Patent: *Mar. 28, 2000

[54] LOW PRESSURE REFRIGERATED DOUGH PRODUCT

[75] Inventors: William A. Atwell, Andover; Stephanie C. K. Hankerson, St. Paul; Michael R. Perry, Plymouth; Victor T. Huang, Moundsview; Diane R. Rosenwald, Plymouth; Katy Ghiasi, Minneapolis, all of Minn.; Andrew H. Johnson, Wildwood, Mo.

[73] Assignee: The Pillsbury Company, Minneapolis, Minn.

[*] Notice: This patent is subject to a terminal disclaimer.

[21] Appl. No.: 08/856,985

[22] Filed: May 15, 1997

Related U.S. Application Data

[63] Continuation-in-part of application No. 08/683,071, Jul. 16, 1996, Pat. No. 5,643,625, which is a continuation of application No. 08/483,401, Jun. 7, 1995, Pat. No. 5,547,694, which is a continuation of application No. 08/035,469, Mar. 23, 1993, abandoned.

[51] Int. Cl.[7] .............................. A21D 8/00; A65D 81/20; A65D 85/00
[52] U.S. Cl. .................................. 426/27; 426/8; 426/60; 426/62; 426/118; 426/128; 426/19; 426/316; 426/551; 426/653; 426/656; 426/395; 426/418; 426/498; 220/89.1; 220/203.11; 220/203.29; 220/367.1; 220/373
[58] Field of Search ................................. 426/8, 60, 118, 426/128, 551, 316, 395, 418, 653, 656, 498, 27, 62, 19; 220/203.11, 203.29, 367.1, 373, 89.1

[56] References Cited

U.S. PATENT DOCUMENTS

| | | | |
|---|---|---|---|
| 4,381,315 | 4/1983 | Yong et al. | 426/94 |
| 4,415,598 | 11/1983 | Chen et al. | 426/394 |
| 4,526,801 | 7/1985 | Atwell | 426/128 |
| 5,366,744 | 11/1994 | Drummond et al. | 426/128 |
| 5,492,702 | 2/1996 | Domingues | 426/62 |
| 5,514,386 | 5/1996 | Domingues | 426/8 |
| 5,540,940 | 7/1996 | Domingues | 426/8 |
| 5,547,694 | 8/1996 | Perry et al. | 426/118 |
| 5,643,625 | 7/1997 | Perry et al. | 426/8 X |
| 5,672,369 | 9/1997 | Lonergan et al. | 426/62 X |
| 5,759,596 | 6/1998 | Domingues et al. | 426/8 |

FOREIGN PATENT DOCUMENTS

| | | | |
|---|---|---|---|
| 672349 | 9/1995 | European Pat. Off. | A21D 10/02 |

OTHER PUBLICATIONS

*Fourier–Based Texture Measures with Application to the Analysis of the Cell Structure of Baked Products*, by Dwight D. Day and Debi Rogers, Digital Signal Processing 6, 138–144 (1996) Article No. 0014.

*Development of an Objective Crumb–Grain Measurment*, by D. E. Rogers, D. D. Day, and M. C. Olewnik, Research CFW 498/Jul. 1995, vol. 40, No. 7.

Pyler, E. J., "Baking Science & Technology" Third Edition, vol. 11, pp. 731–739, 1998.

CrumScan User's Manual, American Insititute of Baking, Devore Systems, Inc. Herta advertisements, 5 pages.

*Primary Examiner*—Milton Cano
*Attorney, Agent, or Firm*—Janal M. Kalis; Aleya Rahman

[57] ABSTRACT

A refrigerated dough system is provided which includes a dough in a container flushed with a gas. The dough contains a leavening agent capable of generating gas in the dough after the dough is sealed in the container. The container is provided with a pressure release mechanism to release excess pressure generated within the container as the dough leavens and during storage. The dough system is capable of sustaining a leavened dough structure during storage so that upon baking the dough, the resulting baked product resembles a freshly prepared and baked dough.

24 Claims, 6 Drawing Sheets

LOW PRESSURE REFRIGERATED DOUGH PRODUCT

This application is a continuation-in-part of application Ser. No. 08/683,071, filed Jul. 16, 1996, now U.S. Pat. No. 5,643,625, issued on Jul. 1, 1997, which is a continuation of application Ser. No. 08/483,401, filed Jun. 7, 1995, now U.S. Pat. No. 5,547,694, issued on Aug. 20, 1996, which is a continuation of application Ser. No. 08/035,469, filed Mar. 23, 1993, abandoned.

BACKGROUND OF INVENTION

The present invention relates to a dough storage system that includes a refrigerated dough product that is stored in a carbon dioxide environment at low pressure and to a method for storing the dough within the dough storage system.

In conventional bakeries, leavening agents are added to doughs to create baked products with a high baked specific volume, defined as a volume of dough divided by its mass. The high baked specific volume in baked products gives these products their desired texture, appearance, and other organoleptic properties. The process for making dough includes mixing the leavening agent with flour, water and other ingredients and allowing the dough to expand or "proof" for a period of time. As the dough expands, the specific volume of the raw dough increases, observed by the dough rising. In general, the relationship between the baked specific volume and the raw specific volume of a dough is such that a high baked specific volume results from a high raw dough specific volume, and a low baked specific volume results from a low raw specific volume.

Baked specific volume (BSV) of dough as used herein refers to volume of a baked dough product in cubic centimeters divided by the mass of the product as measured in grams. Baked dough specific volume has the units of cubic centimeter (cc) per gram.

Raw specific volume (RSV) of dough as used herein refers to a volume of a dough in cubic centimeters immediately prior to baking the dough divided by the dough mass as expressed in grams. The units for raw specific volume are cubic centimeters (cc) per gram.

Packed specific volume (PSV) as used herein refers to a volume of dough in a refrigerated dough package in units of cubic centimeters (cc) divided by mass of the dough in grams. Values for packed specific volume and raw specific volume may differ from each other due to an expansion or contraction of dough upon opening a dough storage container. For the dough system of the present invention, PSV and RSV have values very close to each other because of a lack of expansion or contraction of the dough upon opening the dough storage container.

The specific volume relationship changes in doughs which are packaged and stored under refrigeration conditions. Refrigerated doughs typically comprise a chemically leavened dough. The dough is packaged in a container under pressure. The pressure in the container, which is usually around about 15 to 20 psi, and which can be up to about 40 psi, is generated and maintained by a release of carbon dioxide gas within the container evolved as a result of the leavening reactions in the dough. When the container is opened by a consumer, the dough is subjected to a sudden, traumatic change in pressure. This pressure change radically affects the delicate dough structure. Because of the particular storage conditions of refrigeration temperature, elevated pressure within the container, and extended storage time, followed by the sudden pressure drop when the container is opened, and the requisite manipulation of the dough caused by removing the dough from the container and placing it in a baking container, it has been observed that as the packed specific volume of the raw dough increases, the baked dough specific volume decreases.

As a consequence, as much dough as possible is packed into the container in order to reduce the packed raw dough specific volume, thereby producing the greatest possible specific volume of the baked dough product. Baked specific volumes achievable with refrigerated dough products of this type are not generally as great as is achievable in conventional bakeries or by baking from "scratch" at home.

The Chen et al. U.S. Pat. No. 4,415,598, issuing Nov. 15, 1983, describes a dough container with a mechanism for reducing the rate of dough expansion upon opening the container. In particular, the container is opened so that a pressure head built up by leavening of the dough is released at a rate of less than about 10 psi per second with the time of release being at least about 2 seconds.

The Atwell U.S. Pat. No. 4,526,801, issuing Jul. 2, 1985, describes a refrigerated dough that includes a volatilizable material such as an edible alcohol. The dough has a packed specific volume that is greater than about 1.25 cc/gram. The baked specific volume versus packed specific volume relationship is radically affected by the presence of ethanol. When ethanol is absent, the slope of the baked specific volume versus packed specific volume is negative. As ethanol concentration is increased, the slope becomes more positive.

The Drummond et al. U.S. Pat. No. 5,366,744, issuing Nov. 2, 1994, describes a method for making a packaged dough for extended refrigerated storage. The patent also describes a packaging system for storage of the refrigerated dough. In the packaging system, a rigid tray for receiving a leavened dough is provided. The tray has a bottom wall and upstanding peripheral side walls to define at least one well. At least one leavened dough product is disposed within the well. The leavening reaction of the dough is partially completed to a degree that provides carbon dioxide distribution throughout the dough product. A hermetically sealed cover extending over at least the top of the side walls defines a chamber containing the dough product and a head space surrounding the dough product. A gas comprising a predetermined amount of carbon dioxide is disposed in the head space of the chamber. The gas creates an equilibrium level of carbon dioxide with the carbon dioxide produced in the dough product. Ambient air is replaced by the gas thereby minimizing the amount of residual oxygen and therefore oxidation of the dough product. The barrier package described in the patent is non-pressurized and is hermetically sealed against gas and moisture. Dough retained within the container is treated as necessary in order to prevent any leavening reaction of the unbaked dough product in the package.

European Patent Application No. 95102934.7, filed Mar. 2, 1995, describes a container for dough that includes a one-way valve. The dough described contains a low temperature inactive yeast or a very low activity level of a standard commercial yeast. The container encloses an atmosphere substantially free of oxygen.

SUMMARY OF THE INVENTION

The present invention includes a dough system and a method for making a baked dough product from a stored refrigerated dough. The dough system includes a refrigerated dough comprising a leavening agent. The refrigerated dough defines gas cells and is characterized by a minimum raw or unbaked specific volume after storage, of at least about 1.5 cubic centimeters per gram. The system also includes a gaseous environment in which the dough is stored. The gaseous environment includes a gas mixture within the gas cells that is substantially the same as a gas mixture outside of the dough. The dough system also includes an enclosure for enclosing the dough and the gaseous atmosphere.

The present invention also includes a method for making a dough product that has a minimum raw specific volume of at least about 1.5 cubic centimeters per gram and that is directly proportional to a specific volume of the corresponding baked product. The method includes mixing water, flour and a leavening agent to make the dough. The dough is then transferred to a container. Once the dough is transferred to the container, it is flushed with carbon dioxide and an air impermeable seal is applied to the container over the dough. The container includes a mechanism for releasing pressure within the container while preventing an ingress of air and can be made of a heat resistant material to allow the product to be baked in the container. The dough is stored at a refrigeration temperature and a pressure of less than about 3 psi and preferably less than 1 psi. The leavening reaction in the dough continues inside the container so the desired raw dough specific volume is reached after the dough has been packaged.

DETAILED DESCRIPTION OF THE DRAWINGS

DETAILED DESCRIPTION OF PREFERRED EMBODIMENTS

The dough system of the present invention includes a dough comprising a leavening agent enclosed within an environment comprising carbon dioxide at a pressure of less than about 3 psi pressure, and preferably less than 1 psi such that the leavening agent in the dough can react to achieve a raw dough specific volume in the environment of at least about 1.5 cc/g. The dough and environment are enclosed within a sealed container. A pressure release mechanism is positioned on the container or on an air impermeable barrier, to vent gases generated by the leavening agent. The carbon dioxide in the environment is at a concentration similar to a concentration of gaseous carbon dioxide within gas cells in the dough. The raw dough volume is sustainable at refrigeration temperatures over time and is directly proportional to a baked specific volume.

Gas cells in the dough, created when the dough is mixed, are inflated by generation and expansion of carbon dioxide gas. Gas cell fineness in a product baked from the dough system of the present invention, as measured using Crumb-Scan® software, available from the American Institute of Baking/Devore Systems, Inc. located in Manhattan, Kans., is substantially similar to the gas cell fineness of a freshly prepared and baked dough product.

Dough within the dough system is capable of achieving and sustaining the gas cell structure in the dough, as observed by the raw dough specific volume, at refrigerated temperatures over extended periods of time ranging from several hours to several months, while maintaining a low pressure within the system. Upon baking, the dough system provides a baked product that has a baked specific volume, crumb structure and other attributes substantially similar to those associated with freshly prepared and baked dough products.

The dough system also includes a container for enclosing the dough wherein, in one embodiment, the container includes a pressure release mechanism for release of excess pressure caused by the generation or expansion of carbon dioxide and any other gases in the container. As a consequence, pressure within the container is low when the dough is stored at refrigeration temperatures. The container may be fabricated of materials that permit a consumer to bake the dough in the container. For instance, the container may be made of a heat resistant polymeric material, metallic material or any other food grade, heat resistant material.

Figure 4A:
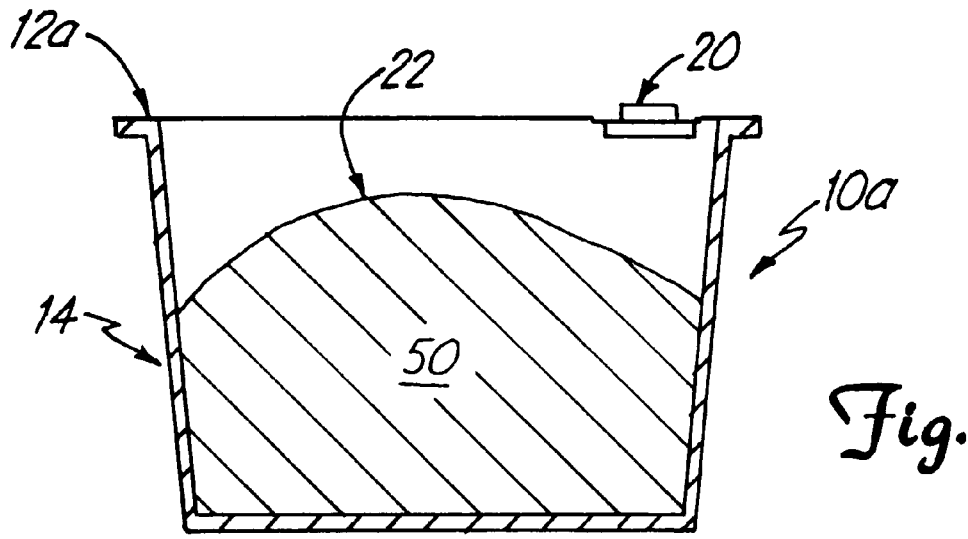
FIG. 4a and 4b illustrate embodiments of the dough system of the present invention.
Figure 4B:
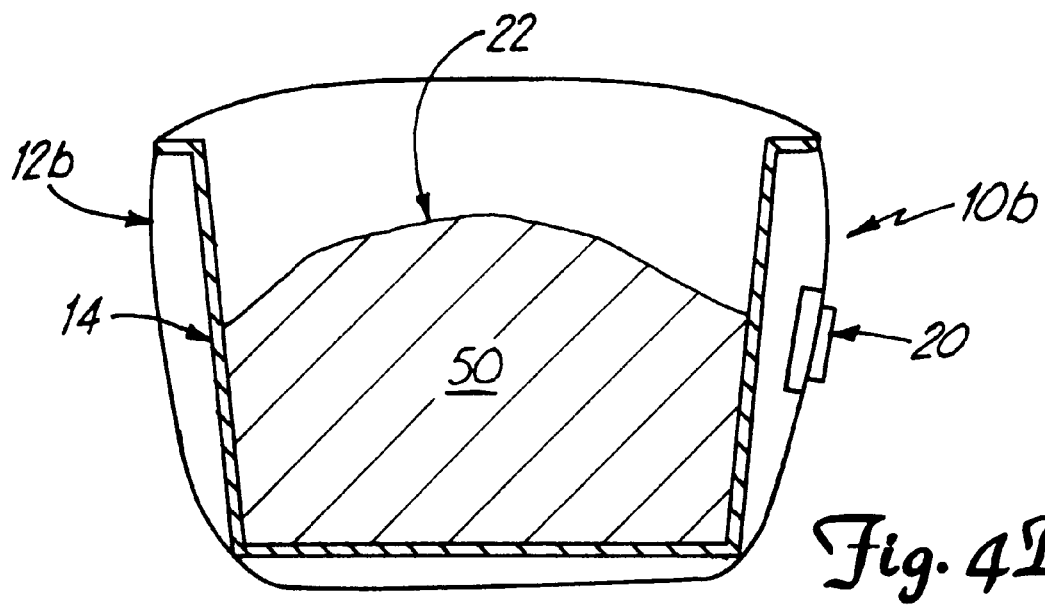

The dough storage system also includes an air impermeable barrier overlaying the container, or sealed to the container. The barrier prevents air from contacting the dough. The barrier may be deformable to a degree that permits the dough to rise to a volume that occupies substantially all of the headspace of the container and barrier. In one embodiment, shown at 10a in FIG. 4a, the barrier 12a of the dough system 10a is sealed to cover container 14 containing dough 50. In this embodiment, pressure release mechanism 20 is positioned in barrier 12a on top of container 14. The barrier may, in one embodiment be sealed to the container. In another embodiment illustrated at 10b in FIG. 4b, the barrier 12b of the dough system 10b encloses and seals the container 14 and dough 50 in a barrier package. With this embodiment, the pressure release mechanism 20 is installed at any location in the air barrier 12b. The dough system 10 may additionally include a non-stick barrier 22, such as parchment, that overlays the dough 50 and prevents dough from sticking to the air barrier 12 or interfering with the pressure release mechanism. The container, mechanism for pressure release and barrier are further described in U.S. Pat. No. 5,643,625, which is herein incorporated by reference.

Figure 6A:
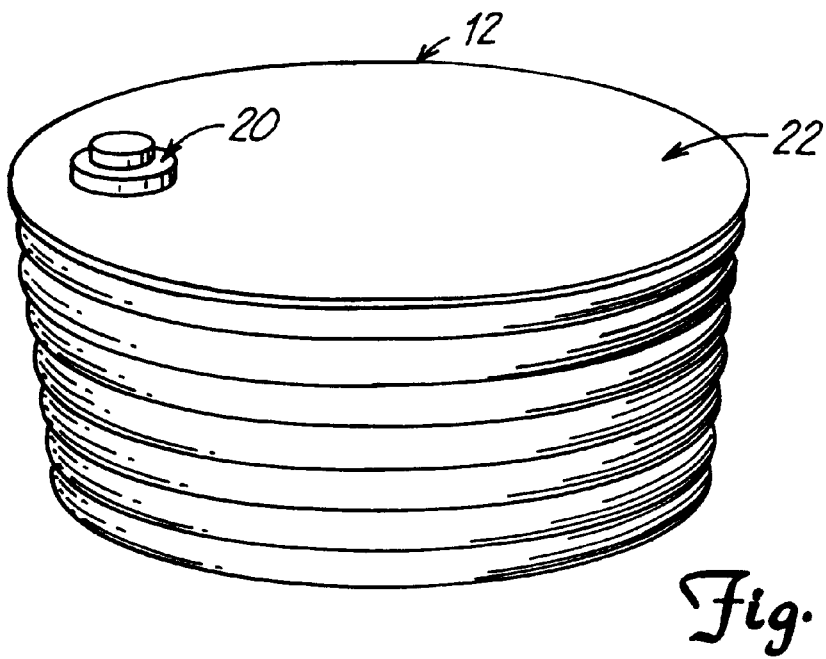
FIGS. 6a and 6b illustrate one embodiment of the dough system of the present invention wherein the container has a boule shape.
Figure 6B:
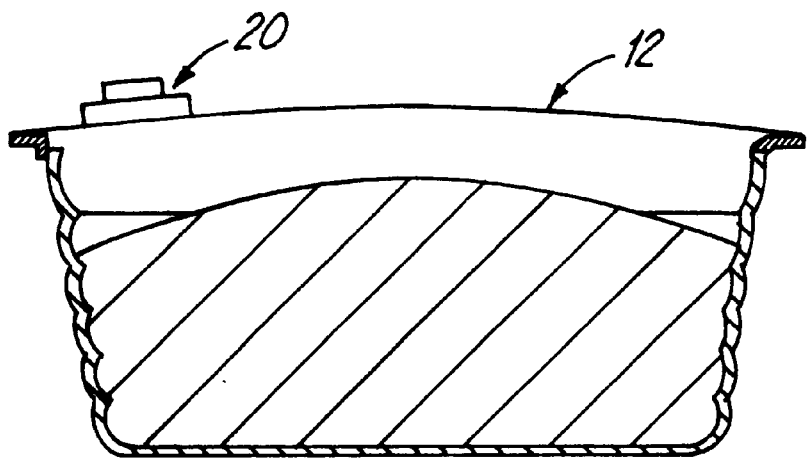

Because of the relatively low pressure within the container, the dough system can be used to impart a shape, imprint or design relief into the dough and baked bread through an imprint, shape or design relief in the container sidewalls or bottom portion. The dough, once sealed inside the container, expands in the container form and takes on the shape, imprint or design of the container. Because the dough in the container is under low pressure, when the container is opened prior to baking, the dough does not rapidly expand or burst out of the container to release excess pressure as in conventional refrigerated dough packaging, and therefore does not lose the shape, imprint or design imparted by the container. The dough can be baked in the container, thereby setting the shape, imprint or design of the baked dough product. For example, the container can be shaped to resemble a European boule pan as shown at 50 in FIGS. 6a and 6b, in which the dough can be baked in and removed from the container to result in a boule-shaped product. Other examples of shapes, imprints or designs for dough systems of the present invention include split-tops or bottoms, cross-hatchings, flutes, lattices, twists, spirals and the like.

For extended refrigerated storage, it is preferable to use a yeast with limited metabolic activity under refrigerated conditions, such as described in U.S. Pat. Nos. 5,540,940; 5,492,702; and 5,514,386.

Chemical leavening agents may also be used, either alone or in combination with yeast. Chemical leavening agents typically comprise a leavening acid and a leavening base, the reaction of which results in the generation of carbon dioxide. Leavening acids are sodium, calcium, or magnesium salts of ortho, pyro and complex phosphoric acids in which at least two active hydrogen ions are attached to the molecule. They may also be organic acids, salts of organic acids or lactones. Examples of leavening acids include monocalcium phosphate monohydrate (MCP), monocalcium phosphate anhydrous (AMCP), sodium acid pyrophosphate (SAPP), sodium aluminum phosphate (SALP), dicalcium phosphate (DCP), dicalcium phosphate dihydrate (DPD), dimagnesium phosphate (DMP), sodium aluminum sulfate (SAS), glucono-delta-lactone (GDL), potassium hydrogen tartrate (cream of tartar), and the like. Sodium bicarbonate, or baking soda, is the most common leavening base, but other leavening bases, such as potassium bicarbonate, ammonium carbonate and ammonium bicarbonate are also useful as leavening bases for bakery products. Either or both of the leavening acid and leavening base may be encapsulated, so that the leavening reaction does not substantially take place until the proper conditions have been achieved in the dough, such as temperature or moisture.

The quantity of leavening agents is selected to provide the desired degree of leavening in the dough. The degree of leavening in the dough determines the final baked product attributes such as texture, structure, grain, specific volume, appearance, and the like. The degree of leavening may range from leavening required to make products with low baked specific volumes, for example, less than 2.0 cc/g, such as foccacia, to products with high baked specific volumes, for example, greater than or equal to about 5.0 cc/g, such as bread.

The dough may be laminated, such as pastry or croissant dough, or non-laminated, such as bread dough. The dough does not require other specific volume enhancing agents, such as ethanol, in order to achieve specific volumes comparable to freshly prepared and baked products, although such products may be added if desired to further enhance the baked specific volume or other attributes of the product.

Figure 5A:
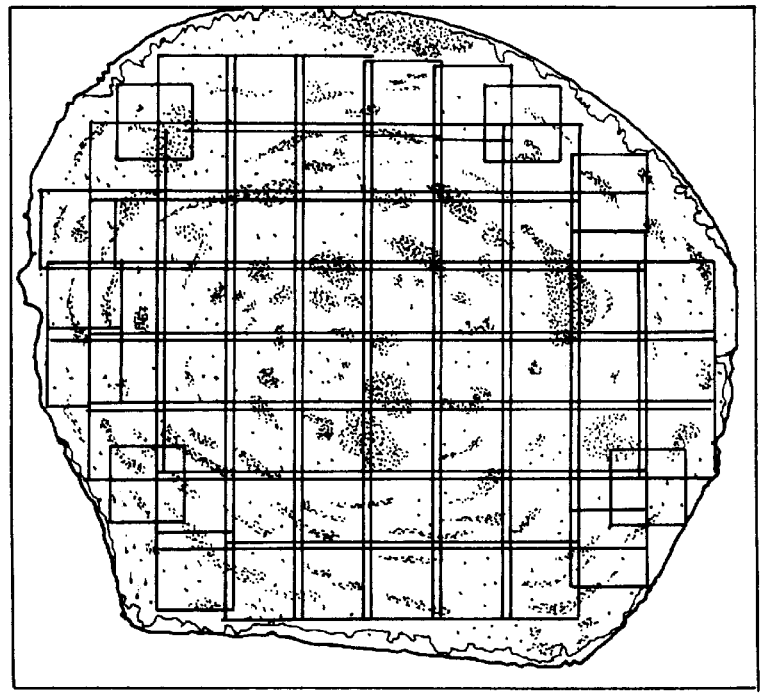
FIGS. 5a and 5b illustrate two crumb distribution embodiments.
Figure 5B:
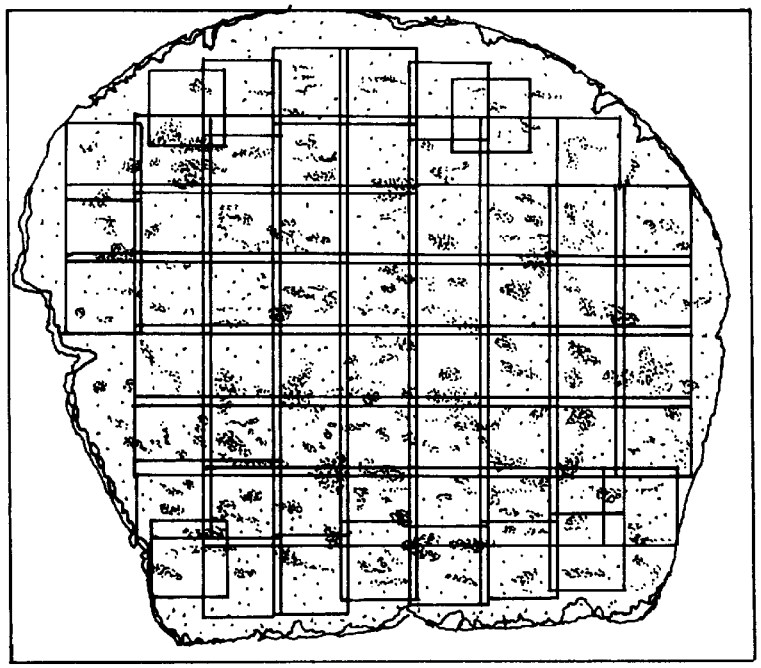

The types of products produced by the dough system of the present invention are preferably those which have a significant crumb structure, such as is shown in FIGS. 5a and 5b. The "crumb" of a baked product is typically defined as the softer, inner portion of the product, as opposed to the "crust" of a baked product, which is the hard outer surface. By "significant crumb structure", it is meant that the total volume of crumb is equal to or greater than the total volume of crust in a baked product. The crumb structure of a baked product can also be described as a collection of local spacial regions defining crumb grain cells. The cells are generally porous and asymmetrical in shape. Crumb structure may vary in a food product in fineness and elongation as a function of distance from the center of the food product. Products having significant crumb structure include breads, rolls, buns, sweet breads, bagels, foccacia, strudel, pretzels, breadsticks, thick crust pizza, thick flat breads, and the like.

It has surprisingly been found that the specific volume of a refrigerated dough, which is leavened and stored in a low or ambient pressure environment, can be directly proportional to baked specific volume of the dough product made by baking the dough using the dough system of the present invention. During storage, the dough in the system of the present invention is kept in a low or ambient pressure environment, even as carbon dioxide continues to be generated by the dough in the container, because the container has a pressure release mechanism to release excess pressure. The dough is, in addition, in an environment containing carbon dioxide at a level similar to the level of gaseous carbon dioxide in the gas cells within the dough. Thus, the dough system of the present invention permits the manufacture of a refrigerated dough that has an extended storage life, which, upon baking results in products having high specific volumes that were heretofore not possible.

In traditional doughs which are not subjected to long term refrigerated storage, gas cell expansion through proofing and baking is a continuum. The proofing step in traditional dough making gives the final baked product its desired texture, crumb structure and appearance. Small amounts of gas in cells in the dough, observed as a low RSV, immediately before baking produce final baked products with low BSV. Conversely, higher RSV doughs, with large amounts of gas in the cells produce high BSV products. Expansion of the traditionally made dough is gradual and is not subject to a traumatic event that ruptures gas cells because there is no imposed pressure release such as is caused when a pressurized container is opened. The gas cell continuum observed in traditional doughs is also observed in the dough described herein.

This direct proportionality result and elevated magnitude for maximum baked specific volume is surprising because the conventional relationship for refrigerated packaged, pressurized dough products, historically, has been, as the packed specific volume goes up, the baked specific volume goes down. This negative slope relationship between baked specific volume and packed specific volume occurs because less dense doughs in a pressurized storage container are more prone to gas cell rupture upon the pressure release that occurs when the can is opened. This rupture may also occur as a result of manipulation upon transfer of the dough to a baking container. The effect is analogous to that of a "falling" cake.

Figure 1:
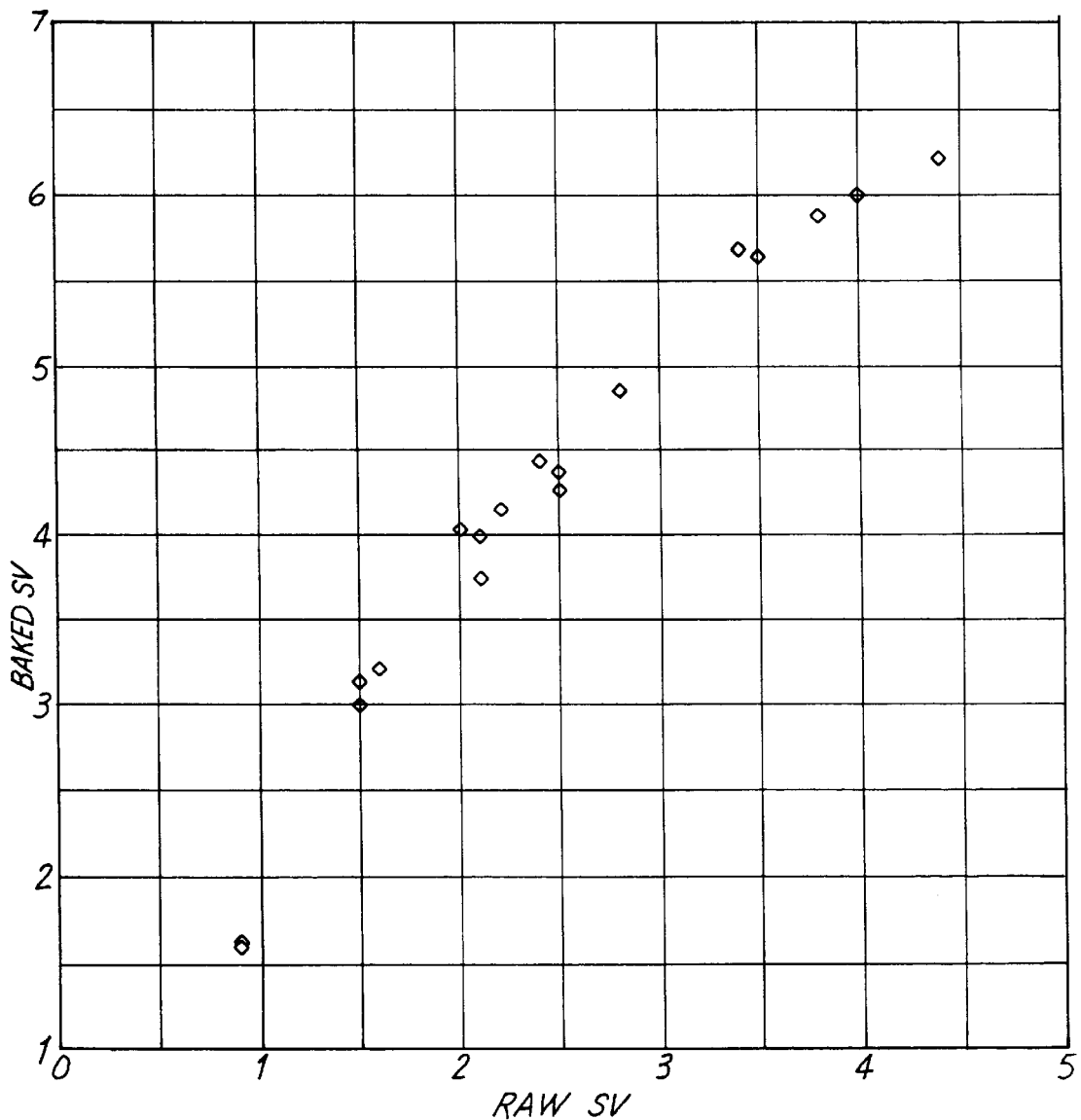
FIG. 1 illustrates a graphical view of raw specific volume (RSV) and baked specific volume (BSV) of the dough of the present invention.

In the present invention, a contrary result is achieved as illustrated in FIG. 1 because the baked specific volume increases with the raw dough specific volume. As a result of this increase in specific volume, it is possible for a dough manufacturer to utilize a smaller mass of dough in order to make a dough having a high raw specific volume, which results in a higher baked specific volume in the final baked product. As discussed previously, in conventional pressurized, packaged refrigerated doughs, it has not been possible to achieve this relationship between raw specific volume and baked specific volume without the addition of volume enhancing agent, such as ethanol.

The present invention, because of the enriched carbon dioxide environment, also substantially avoids the occurrence of "grey dough" which occurs when dough is exposed to oxygen. Because of the low pressure environment of the present invention, the dough system also substantially avoids the detrimental effects caused by excess pressure generated by the dough, such as package failure, since excess pressure is released out of the system over the storage life of the dough.

It is believed that the reduction in storage pressure in the product system of the present invention as compared to conventional pressurized containers permits gas cell formation that is substantially the same as gas cell formation in a fresh, traditionally prepared, unstored dough without addition of ethanol to the dough. Ethanol affects the gluten protein in dough in a way to make gas cells in expanded doughs more resistant to rupture, thereby yielding a positive BSV/PSV relationship and restoring the traditional relationship found in unstored doughs for conventional refrigerated doughs. Doughs that contain high levels of ethanol are very elastic. This Theological change may be a basis of rupture resistance of gas cells in expanded doughs to which ethanol is added. As discussed in the Background, pressurized dough conventionally is exposed to a pressure of up to about 40 psi. When a consumer desires to bake the dough, the consumer releases the pressure which causes a rapid expansion and subsequent decline in the gas holding properties of the dough. As a result, the raw specific volume of the dough can be less than the raw specific volume for freshly made dough as well as the dough of the system of the present invention.

The dough system of the present invention reduces damage to the dough structure arising from events of pressurized opening and handling found in conventional refrigerated dough containers. These damaging events have been eliminated due to a one-way pressure release mechanism which is a built in feature of the dough system of the present invention that restores the traditional BSV/PSV relationship without the use of ethanol. The damage to the dough structure is also eliminated by designing the storage container so that the container reinforces the dough structure during storage and distribution and so that it can be used to bake the dough without requiring the dough to be removed from the container.

The dough system of the present invention permits a production of refrigerated doughs that are capable of yielding a predictable and wide variety of BSVs as well as substantially all products that can be made in a traditional baking process. As is shown in FIG. 1, the baked specific volume performance of the dough of the present invention is positively correlated to the raw specific volume of the dough. With the dough system of the present invention, high BSV products, such as bread having a BSV that is greater than about 5.0 cc/gm, can be made from dough stored at a refrigeration temperature for an extended period of time, from one week to several months.

Conventionally refrigerated storage systems typically have PSV ranges of about 1.0 to 1.5 cc/gm and BSV ranges of about 2.0 cc/gm to about 3.5 cc/gm. Doughs of the system of the present invention preferably have PSV and BSV values outside of these ranges with PSV values ranging from above about 1.5 cc/g, preferably above about 2.0 cc/g, and BSV values above about 3.5 cc/g, preferably above about 4.0 cc/g.

Conventionally refrigerated pressurized dough storage systems cannot produce baked bread having a maximum specific volume of the magnitude shown in an upper right quadrant of FIG. 1 without adding a large quantity of ethanol to the refrigerated dough in addition to any ethanol produced by leavening reactions. Problems with such ethanol addition to commercial doughs include a substantial added expense, difficulties in processing the highly elastic doughs and compliance with extensive regulatory requirements. The dough system of the present invention makes additional ethanol unnecessary in order to increase specific volume.

Because conventional pressurized refrigerated doughs undergo significant structural damage when the container is opened and the dough is removed from the container and manipulated into a suitable baking container, these conventional doughs have not typically produced baked products with a specific volume of more than about 4.0 cc/gm. The damage to the dough structure accounts for the generally negative correlation between packed dough specific volume and baked specific volume in conventional refrigerated dough products. Reducing the packed dough specific volume in conventional products helps to reduce the damage to the dough structure, so that the dough upon baking can achieve specific volumes ranging from about 3 cc/gm to about 4 cc/gm.

Using the dough system of the present invention, however, it is possible to provide refrigerated, packaged doughs which can produce baked products having specific volumes greater than 4.0 cc/gm, and may be able to exceed 7.0 cc/gm depending on the dough formulation and proofing conditions. The positive correlation between the raw or packed dough specific volume and baked product specific volume permits the dough to achieve a high packed specific volume during proofing, which, rather than being detrimental to the baked specific volume as in conventional products, translates positively into a desired high baked product specific volume.

EXAMPLE I

One illustration of the experimental relationship between raw specific volume of dough of the present invention and baked specific volume is shown graphically in FIG. 1. For the actual slope generated from actual data, the baked specific volume, that is, the volume of baked product divided by its weight, is a function of the expansion of gas in the dough due to the elevated temperatures during baking, the retention of the gas by the dough in the dough stage and the weight loss of the product during baking.

The raw specific volume for dough in the system of the present invention ranged from about 1 to about 4.5 cc/gm, depending upon the amount of leavening used per gram of dough. The baked specific volume, that is, the volume of baked product divided by its mass, is a function of the expansion of gas in the dough due to elevated temperatures during baking, the retention of gas by the dough in the dough stage, and the weight loss of the product during baking. The data for FIG. 1 was generated using a tray-type container such as a small bread pan with the dimensions of a top width of 3.5 inches, a top length of 7.25 inches, a bottom width of 2.5 inches, a bottom length of 6.5 inches and a height of 2.25 inches. The formula for these doughs is described in Table 1:

TABLE 1

| Ingredient | Formula 1 wt % | Formula 2 wt % | Formula 3 wt % | Formula 4 wt % | Formula 5 wt % |
| --- | --- | --- | --- | --- | --- |
| water | 30.31 | 29.88 | 29.46 | 29.03 | 28.6 |
| flour | 52.43 | 51.69 | 50.96 | 50.22 | 49.48 |
| flavor | 2.67 | 2.67 | 2.67 | 2.67 | 2.67 |
| shortening | 3 | 3 | 3 | 3 | 3 |
| gluten | 3.92 | 3.92 | 3.92 | 3.92 | 3.92 |

TABLE 1-continued

| Ingredient | Formula 1 wt % | Formula 2 wt % | Formula 3 wt % | Formula 4 wt % | Formula 5 wt % |
|---|---|---|---|---|---|
| xanthan gum | 0.11 | 0.11 | 0.11 | 0.11 | 0.11 |
| mono-glyceride | 0.4 | 0.4 | 0.4 | 0.4 | 0.4 |
| sugar | 4 | 4 | 4 | 4 | 4 |
| dextrose | 2 | 2 | 2 | 2 | 2 |
| GDL* | 0 | 0.62 | 1.23 | 1.85 | 2.7 |
| E-soda | 0 | 0.55 | 1.09 | 1.64 | 2.19 |
| salt | 1.16 | 1.16 | 1.16 | 1.16 | 1.16 |
| TOTAL | 100.00 | 100 | 100 | 100 | 100 |

*GDL = glucono-delta-lactone
**E-soda = encapsulated sodium bicarbonate

TABLE 2

| FORMULA | LEAVENING | TOTAL WEIGHT |
|---|---|---|
| 1 | 0 X | 800 g |
| 2 | 0.5 X | 600 g |
| 3 | 1.0 X | 410 g |
| 4 | 1.5 X | 350 g |
| 5 | 2.0 X | 255 g |

The ingredients were mixed to make the dough. The range of raw specific volumes occurred as a result of differing amounts of leavening agents and differing amounts of dough packed in the tray. The dough was sheeted and cut to a size conforming to the tray. Once cut, the dough was rolled and transferred to the container of the system of the present invention. Between about 250 and 800 grams of dough was transferred to each container depending upon the leavening level as shown in Table 2. The container and dough were then flushed with carbon dioxide. A gas impervious barrier film was then sealed to the container. After about a week, the dough had expanded to almost fill the package. After fourteen days, the film was removed and the dough was baked at 375° Fahrenheit until the moisture loss in the baked dough was about seven percent by weight. RSV was measured prior to baking and BSV was measured on the baked product after cooling. For RSV volume measurements, the entire package was immersed in water, the water displaced was measured and the volume of the packaging materials was subtracted to yield the volume of the dough. In the BSV cases, volume values were measured by rapeseed displacement. The rapeseed displacement method includes steps of measuring the volume of a selected quantity of rapeseeds, then pouring the rapeseeds over the baked product and measuring the increase in volume to determine the change in volume caused by the baked product.

Figure 2:
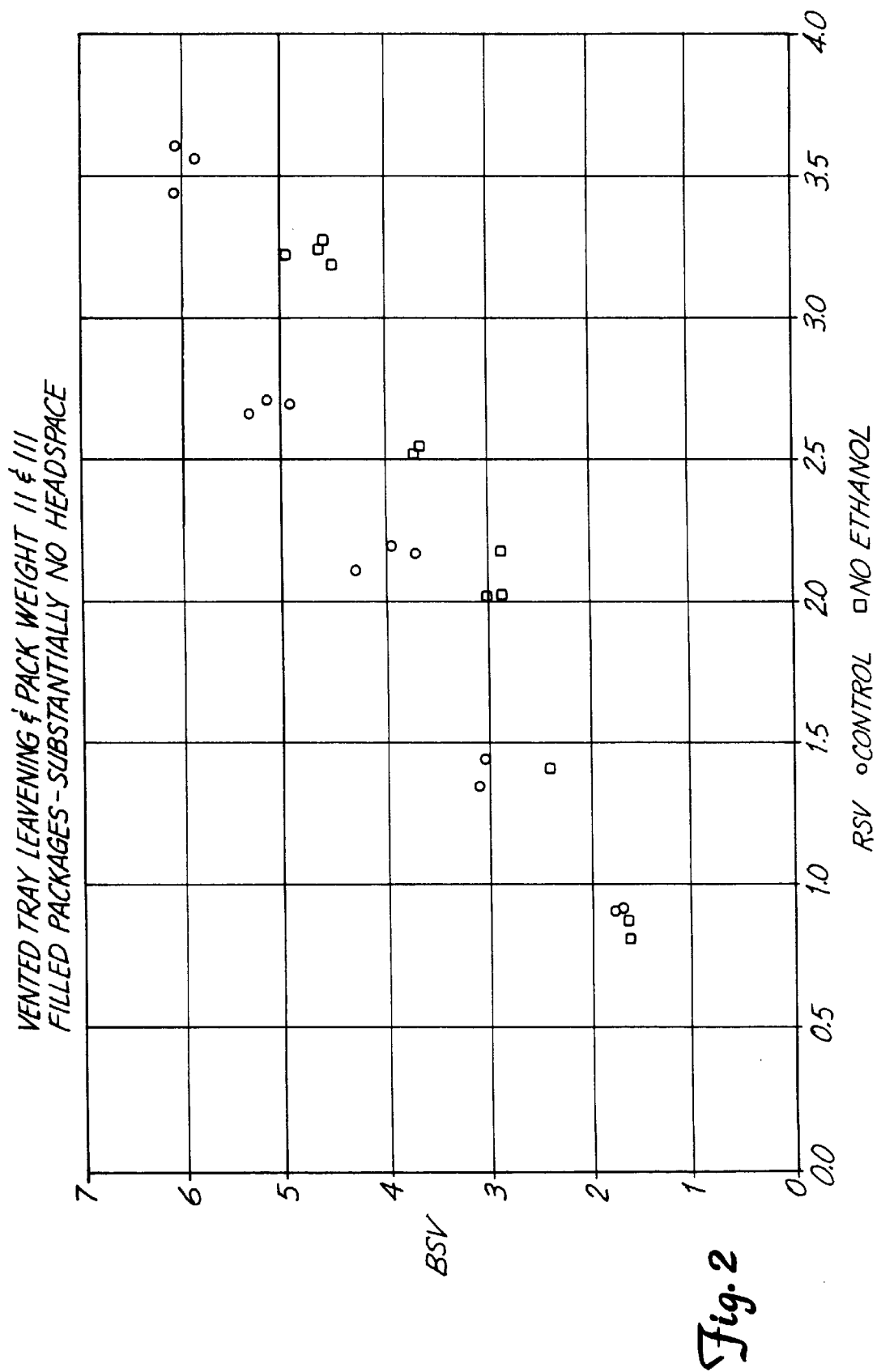
FIG. 2 illustrates a graphical view of a comparison of raw specific volume (RSV) and baked specific volume (BSV) for filled packages, i.e. no headspace, of the present invention under conditions in which ethanol is added to the dough as well as conditions wherein the dough is free of added ethanol.

Two groups of doughs, each containing different levels of leavening ingredients were prepared in order to gather the data displayed in FIG. 2. A first control group was not treated with ethanol. A second group was treated with ethanol during the dough mixing step. Ethanol was added in a concentration of about 2% by weight of the dough. In all cases, the weight and leavening levels produced doughs that almost filled the entire vented container. Both groups were stored in the container of the dough system of the present invention.

Figure 3:
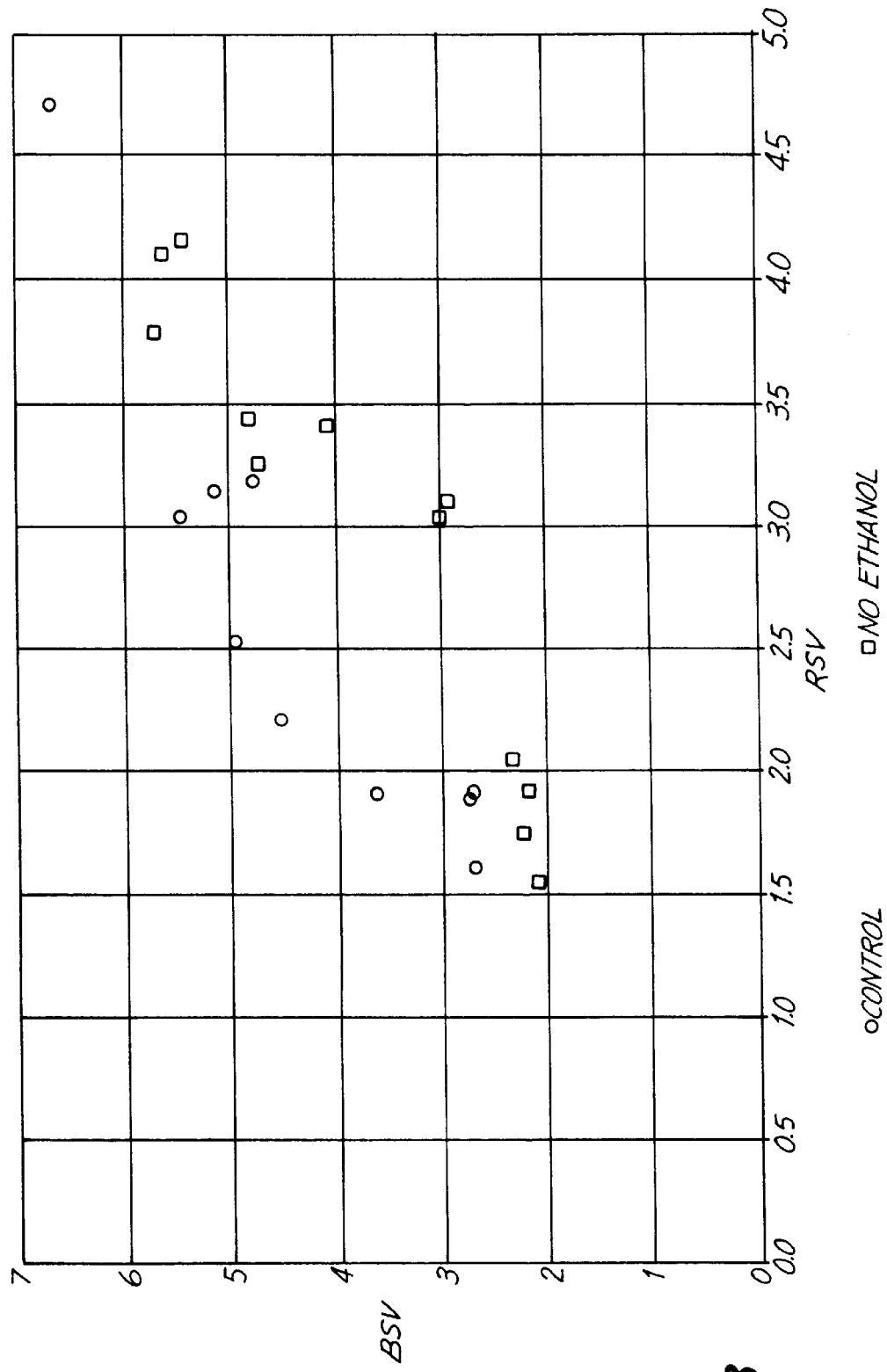
FIG. 3 illustrates a graphical view comparison of raw specific volume and baked specific volume for unfilled packages of the present invention wherein in one instance exogenous ethanol is added to the dough and in a second instance no exogenous ethanol is added to the dough.

FIG. 3 graphically illustrates two groups of dough prepared using ingredients described for dough specific volume illustrated in FIGS. 1 and 2. A first control group did not include ethanol and was packaged in the containers of the dough system of the present invention. A second group did include ethanol in a concentration of about 2% by weight. For both groups, 100 grams of dough with various leavening levels was added to containers of the dough system of the present invention so that a headspace remained in the packages after addition of the dough. As shown in FIG. 3, both groups had similar slopes when BSV was plotted versus RSV. For BSV calculations, volume was measured by rapeseed displacement. For RSV calculations, volume of the dough was estimated by taking measurements of the radius and length of the cylindrical dough and calculating the volume.

With respect to the requirement of the dough system being flushed with carbon dioxide prior to sealing the container, it is believed that gas flushing is required prior to sealing the container to substantially eliminate oxygen from the container, since the presence of oxygen is detrimental to the dough over time. Oxygen causes graying or oxidation of the dough surface, which adversely affects the appearance and functionality of the dough. While not intending to be bound by theory, it is believed that the carbon dioxide present in the package should be in an amount sufficient to limit the release of carbon dioxide entrapped in the dough. It is preferable to flush the system with carbon dioxide at least a percent volume of the flushing gas which is similar to the percent of carbon dioxide gas trapped within the gas cells of the dough. A test was performed in order to determine the composition of gases within the dough system of the present invention. A dough was prepared and proofed as described above. The dough was then placed in an air-tight container and was squeezed. Squeezing the dough forced gases within air cells of the dough to be released and measured. What was found was that the gas composition in the dough was about 86% carbon dioxide volume/volume, 12% nitrogen volume/volume and 2% oxygen. It is believed that in general, the gaseous environment of the dough system of the present invention will have a carbon dioxide range of 80–100%, a nitrogen range of 10–20% and an oxygen range of about 0–2%. It is further believed that the headspace, preferably should have a similar percent gas composition. For example, if the gas cells of the dough contain approximately 80% by volume carbon dioxide and 20% by volume nitrogen, the container containing the dough should be flushed with a gas containing a non-reactive gas such as nitrogen. It has also been found that flushing the container with 100% carbon dioxide is suitable for the present invention.

EXAMPLE II

A dough of the present invention, having a raw specific volume of 2.6 cc/g, was formulated according to the "stored dough" formula in Table 3 and a fresh bakery dough was formulated according to the "fresh dough" formula in Table 3. Pack weights for both of these products was 300 grams. For the dough of the present invention and the fresh dough, first stage ingredients were mixed for 30 second at setting 1 and 5 minutes at setting 2 in a Hobart mixer equipped with a McDuffee bowl. Second stage ingredients were then added and incorporated by mixing for another 30 seconds at setting 1 and 3 minutes at setting 2. The dough was then sheeted to a thickness of about 8 mm and folded to create three dough layers. The folded dough was sheeted again to a thickness of about 5 mm. Dough pieces were cut from the dough sheet, having a width of about 5.5 inches and the length necessary to weigh 300 g. The pieces were then lightly misted with water and were rolled tightly.

The dough of the present invention was placed in a heat resistant tray, flushed with carbon dioxide gas, and sealed with a gas barrier lidding material. The tray was made of CPET and was about 7 inches long, 3.5 inches wide, and 2 inches deep with tapered side and end walls. The lidding included a one-way valve. The samples were placed in refrigerated storage for 6 weeks at 40° F. prior to baking. The fresh bakery dough was placed in the same type of tray, then proofed at about 100° F. until reaching a raw specific volume of about 2.6 cc/g (about 1.5 hours). The fresh, proofed bakery dough was baked immediately after proofing.

Both products were baked on the same rack of a reel oven at the same time at 375° F. for 27 minutes. Two samples from each type of dough were analyzed. Baked specific volume of the resulting products was measured by first measuring the volume (in cubic centimeters) of the product using the rapeseed displacement method, and dividing the volume by the mass in grams. Fineness scores were measured using the CrumbScan® software program, available from the American Institute of Banking/Devore Systems, Inc., located in Manhattan, Kansas. Baked specific volume and fineness scores are summarized in Table 4.

The CrumbScan® analysis was conducted by taking a center slice and an end slice (about 1 inch from an end) from each loaf. Slices were placed in a scanner guide component of a flatbed scanner such as is manufactured by Hewlett-Packard, Palo Alto, Calif., under the name "HP ScanJet 4C." The imaging data obtained from the scanner was processed with the CrumbScan® software. The software program computed the fineness score of each slice, which measures the size of the air cells in the slice of each product. The composite fineness score was determined by measuring the fineness across the entire surface of the slice. The average fineness score was determined by taking the average of the fineness scores of each sample.

As seen in Table 4, baked specific volumes and composite fineness scores of the dough of the present invention, after extended refrigerated storage, were comparable to baked specific volumes and composite fineness scores of freshly prepared and freshly baked dough products.

TABLE 3

| Ingredients | Stored Dough wt % | Fresh Dough wt % |
|---|---|---|
| First Stage | | |
| Flour | 50.16 | 50.88 |
| Water | 20.09 | 20.33 |
| Ice | 9 | 9 |
| Flavor | 2.67 | 2.67 |
| Shortening | 3 | 3 |
| Gluten | 3.92 | 3.92 |
| Xanthan | 0.11 | 0.11 |
| Monoglyceride | 0.4 | 0.4 |
| Second Stage | | |
| Sucrose | 4 | 4 |
| Dextrose | 2 | 2 |
| GDL | 1.85 | 1.85 |
| E-soda(stored), Soda(fresh) | 1.64 | 0.98 |
| Salt | 1.16 | 1.15 |
| Total | 100 | 100 |

TABLE 4

| Sample | BSV cc/g | Average BSV | Composite Fineness Score | Average Composite Fineness Score |
|---|---|---|---|---|
| Stored Dough I | 4.52 | 4.47 | 472 | 477 |
| Stored Dough II | 4.42 | | 482 | |
| Fresh Dough I | 4.34 | 4.33 | 480 | 471 |
| Fresh Dough II | 4.32 | | 462 | |

EXAMPLE III

Fresh bakery dough products, and stored dough products of the present invention were prepared using the ingredients listed in Table 3 and in the manner described in Example I. The samples of the present invention were prepared with encapsulated sodium bicarbonate. The bakery samples were prepared with non-encapsulated sodium bicarbonate instead of encapsulated sodium bicarbonate, but were otherwise made identical to the samples of the present invention.

Samples of the dough system of the present invention were placed in trays, flushed with carbon dioxide and sealed with a gas barrier lidding. The lidding included a one-way valve. These samples were allowed to remain at room temperature for about 2 hours and were placed in refrigerated storage for 6 weeks at 40° F. prior to baking.

Bakery samples were placed in trays and in a proof chamber for about 1.5 hours. The dough was proofed during this interval to a raw specific volume approximately equal to the dough system products of the present invention. These samples were baked directly after proofing.

The trays used for both samples were about 7 inches long, 3.5 inches wide and 2 inches deep with tapered side and end walls. All products were baked on the same rack of a reel oven at the same time at 375° F. for 27 minutes. Baked specific volume of all of the samples was measured by dividing the volume, obtained by rapeseed displacement, by the weight. Fineness scores were measured using the CrumbScan® software program described above. Fineness was measured at the end of the samples and in the center of the samples. Results of the fineness and specific volume tests are shown in Table 5. The data show that the dough system of the present invention produced a baked product having a specific volume and fineness similar to the fresh bakery product.

TABLE 5

| Sample | Weight (grams) | Volume (cc) | Specific Volume | Average Specific Volume | Fineness (end) | Fineness (center) | Average Fineness |
|---|---|---|---|---|---|---|---|
| Stored Dough I | 277.6 | 1400 | 5.04 | 5.07 | 449 | 423 | 429 |
| Stored Dough II | 273.1 | 1425 | 5.22 | | 415 | 414 | |
| Stored Dough III | 277.2 | 1375 | 4.96 | | 442 | 430 | |
| Fresh Dough I | 269.2 | 1375 | 5.11 | 4.92 | 426 | 450 | 454 |
| Fresh Dough II | 271.1 | 1300 | 4.80 | | 438 | 517 | |
| Fresh | 269.7 | 1350 | 5.01 | | 454 | 455 | |

TABLE 5-continued

| Sample | Weight (grams) | Volume (cc) | Specific Volume | Average Specific Volume | Fineness (end) | Fineness (center) | Average Fineness |
|---|---|---|---|---|---|---|---|
| Dough III Fresh | 270.7 | 1325 | 4.89 | | 436 | 443 | |
| Dough IV Fresh | 271.6 | 1300 | 4.79 | | 485 | 438 | |

While preferred embodiments of the present invention have been described, it should be understood that various changes, adaptations, and modifications may be made herein without departing from the spirit of the invention and the scope of the appended claims.

What is claimed is:

1. A dough system comprising:
   a refrigerated dough comprising a leavening agent, and defining gas cells, the dough characterized by a minimum raw specific volume obtained by proofing the dough of al least about 1.5 cubic centimeters per gram;
   a gaseous environment in which the dough is stored wherein a gas within the gas cells is substantially the same as a gas outside of the dough;
   an enclosure for enclosing the dough and the gaseous environment; and
   a pressure relief mechanism positioned adjacent The enclosure; wherein the pressure relief Mechanism maintains a pressure of less than about 3psi within the enclosure.

2. The dough system of claim 1 wherein the enclosure includes a container for containing the dough.

3. The dough system of claim 2 wherein the container has a symmetry that is imparted to the dough.

4. The dough system of claim 3 wherein the container further includes a design or pattern that is imparted to the dough.

5. The dough system of claim 2 wherein the container is made of a material that permits the dough to be baked in the container.

6. The dough system of claim 1 wherein the gaseous environment includes carbon dioxide.

7. The dough system of claim 1 wherein the gaseous environment includes nitrogen.

8. The dough system of claim 1 wherein the pressure relief mechanism maintains pressure within a range of about 1 to 2 psi pressure within the enclosure.

9. The dough system of claim 1 wherein the dough has a raw specific volume that does not decrease at refrigeration temperatures.

10. The dough system of claim 1 wherein the dough has a raw specific volume that does not substantially change over time.

11. The dough system of claim 1 wherein a direct proportional relationship exists between the raw specific volume and baked specific volume of the dough.

12. The dough system of claim 1 wherein the dough is further characterized by a gas cell profile that, after a leavening reaction is completed and a resulting raw specific volume is reached, is substantially the same as a gas cell profile of a freshly made, non-refrigerated, non-enclosed leavened dough having substantially the same raw specific volume.

13. The dough system of claim 1 wherein the enclosure includes a barrier film that substantially prevents an ingress of air into the environment.

14. The dough system of claim 13 wherein the barrier encloses a container.

15. The dough system of claim 13 wherein the pressure relief mechanism is positioned on the barrier.

16. The dough system of claim 1 wherein the dough product yields a baked product with a significant crumb structure.

17. The dough system claim 1 wherein the dough is baked to make a baked product selected from the group consisting of a bread, roll, bun, sweet bread, bagel, foccacia, strudel, pretzel, breadstick, thick crust pizza and thick flat bread.

18. The dough system of claim 1 wherein the enclosure encloses a headspace that can vary.

19. The dough system of claim 1 wherein the leavening agent is yeast.

20. The dough system of claim 1 wherein the leavening agent is a chemical leavening system.

21. A method for making a dough product from a dough with a raw specific volume that is at least about 1.5 cubic centimeters per gram, wherein the dough, once a leavening reaction is substantially completed and a resulting raw specific volume is reached, has a gas cell profile like the gas cell profile of a freshly made, non-refrigerated, non-enclosed leavened dough, comprising:
   preparing a dough that includes a leavening agent;
   permitting the dough to rise;
   sealing an effective quantity of dough into an enclosure wherein the enclosure includes a
   mechanism for releasing pressure within the enclosure;
   permitting the dough to rise in the sealed enclosure; and
   storing the dough at refrigeration temperature.

22. The method of claim 21 and further including flushing the container with carbon dioxide prior to sealing the enclosure.

23. The method of claim 21 and further including storing the dough at a pressure of less than about 3 psi.

24. The method of claim 21 wherein the dough achieves a specific volume of at least about 4.0 cc/g after baking.

* * * * *